MAGNETIC RECORDING APPARATUS

Filed March 31, 1955

INVENTOR.
Lockwood D. Burton
BY Morris L. Rabkin
ATTORNEY.

United States Patent Office 2,751,439

Patented June 19, 1956

2,751,439

MAGNETIC RECORDING APPARATUS

Lockwood D. Burton, Collingswood, N. J., assignor to Radio Corporation of America, a corporation of Delaware Application March 31, 1955, Serial No. 498,264

5 Claims. (Cl. 179—100.2)

This invention relates to magnetic recording apparatus, and more particularly to means for mounting a magnetic record transducer.

Systems have been provided wherein magnetically recorded information has been recorded on magnetic record tapes as a plurality of parallel tracks. Although in some such systems the information recorded in each of the tracks is independent from the information recorded in the other tracks, there are other systems wherein the information recorded in each of the several tracks bears a distinct time relationship with respect to the information recorded in each of the other tracks. In reproducing a record of this latter type, which may, for example, be a system for recording television signals on tape, care must be exercised to insure that the time relationship of the signals on the several tracks is maintained. In such systems, it is usual that the reproduce head or transducer is aligned as nearly exactly with the recording head or transducer as is possible. However, even though the same transducer is used to reproduce the information as was used to record the information, thereby assuring an exact reproduction of the alignment of the transducers, the tape itself may during the time between recording and reproducing become stretched on one side with respect to the other, thereby causing a displacement of the information in one or more tracks with respect to the information in others. This is known in the art as skewing of the tape.

It is an object of this invention to provide a means for mounting the reproduce head in such a way that the skewing of the tape is compensated for by a corresponding movement of the head or transducer.

It is another object of this invention to provide a mounting means for a transducer as set forth wherein the movement of the transducer to correct for the skew is controlled by a signal derived from the record, itself.

In accomplishing these and other objects, there has been provided, in accordance with the present invention, an arm for carrying the transducer, the transducer being mounted at one end thereof. The arm is provided with two leg members, one of which is relatively rigid, the other of which is relatively flexible. The end portion on which the transducer is mounted is connected directly to the flexible portion and, through a deformable link or hinge member, to the rigid leg. A signal responsive motive device is coupled between the rigid leg member and the flexible leg member. When signals derived from the record are applied to this signal responsive member, the flexible leg of the arm is deformed by operation of the signal responsive motive device, causing a rotational movement of the transducer about the hinge member connecting the end portion of the arm to the rigid leg.

Figure 1:
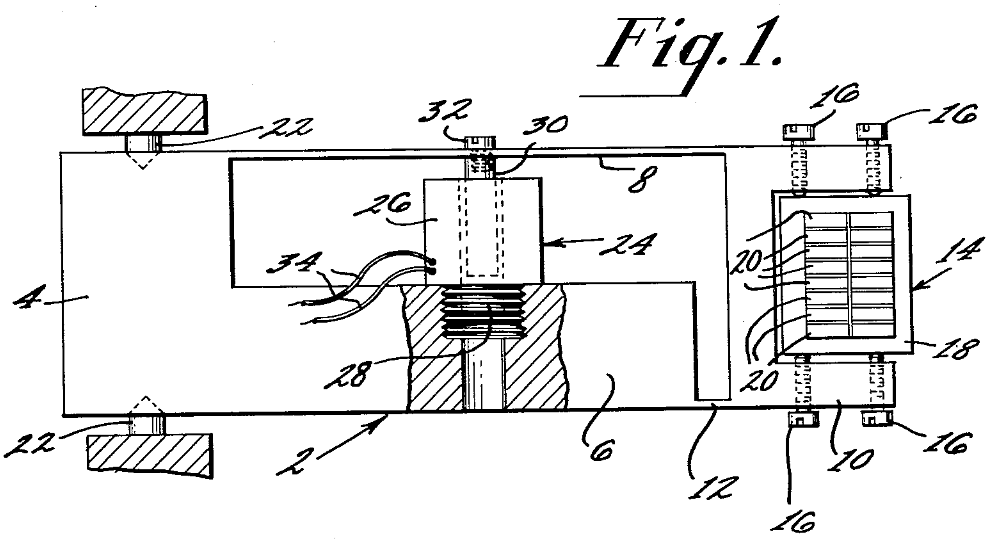
Figure 2:
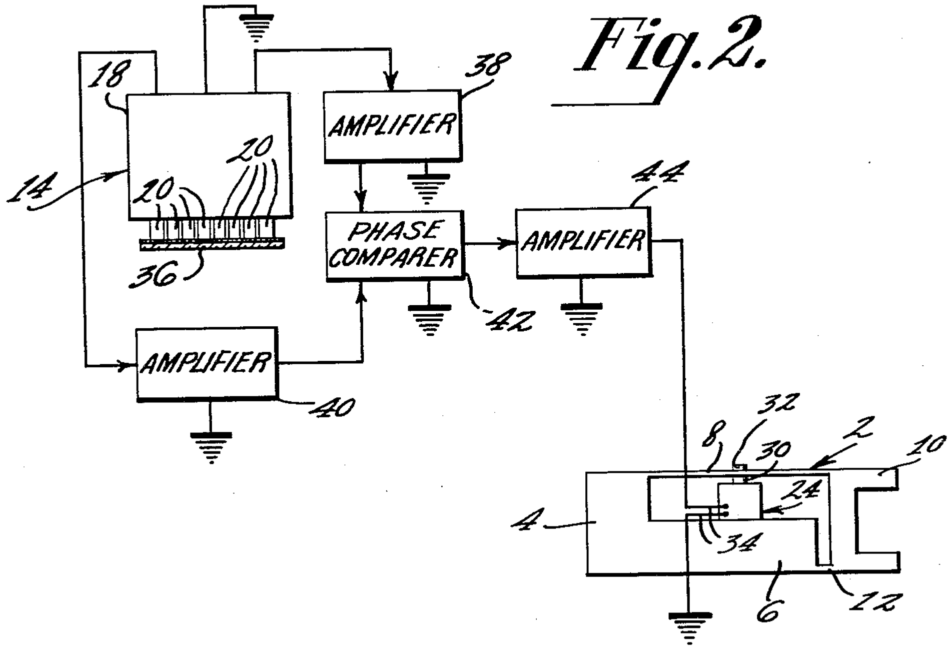

A better understanding of this invention may be had from the following detailed description when read in connection with the accompanying drawing in which:

Fig. 1 is an elevational view partly broken away of a transducer mounting member constructed in accordance with the present invention; and Fig. 2 is a schematic diagram showing circuitry suitable for use in conjunction with the arm shown in Fig. 1 for producing the desired motion in the transducer.

Referring now to the drawing in more detail, there is shown in Fig. 1 a transducer mounting arm 2 which includes the rigid back or supporting portion 4. Extending from the back portion 4 is a rigid leg member 6 and a flexible or deformable leg member 8. A relatively rigid transducer supporting yoke or bracket 10 is secured to one end of the flexible leg member 8 at one end of the yoke 10. The other end of the yoke 10 is connected to the rigid leg member 6 by a deformable link or flexible hinge member 12. A multiple channel transducer 14 is supported in the yoke 10 by means of screws 16. The transducer 14 includes a housing member 18 and a plurality of separate transducer elements 20. The number of such elements corresponds to the number of channels to be recorded on a tape member, eight such channels being illustrated in the drawing. The arm 2 is mounted on the associated apparatus (not shown) by suitable means such as pivot members 22 which engage the arm at the rigid back portion 4.

As thus far described, it may be seen that any force causing a deformation of the flexible leg 8 will cause a relative shortening of that leg with respect to the rigid leg 6. Such effective shortening of the flexible leg causes the yoke member 10, together with the transducer unit 14, to be rotated about an axis determined by the deformable link or hinge member 12. If the forces applied to cause the deformation of the flexible leg 8 were to be controlled to correspond to the amount of skew encountered in the record, then the motion developed in the head or transducer can be made to correspond to the skewing of the tape, compensating for such skew.

To provide such controlled deformation, there is provided a signal responsive motive member 24. In the illustrative embodiment of this invention, this motive member is shown as being a solenoid, the coil 26 of which is secured to the rigid leg member 6 as by means of the threaded body portion 28. The armature 30 of the solenoid is secured, by means of a screw 32, to the flexible leg 8 of the arm member 2. Record derived signals are applied to the solenoid through the leads 34.

Reference is now had to Fig. 2. A magnetic tape record member 36 is passed in signal translating engagement with the transducer unit 14. Signals from the two outermost or extreme transducer elements 20 are amplified in amplifiers 38, 40, respectively. The output of these two amplifiers is fed to a phase comparer 42. Here the phase of the two amplified signals is compared. This phase comparer 42 may be of the type shown in more detail in copending application of Adolph R. Morgan, Serial No. 487,293, filed February 10, 1955. If there is no skew in the tape, then the signals applied to the phase comparer 42 from the two extreme tracks will be in phase with respect to each other. The phase comparer in this case will produce no correction signal. However, if the tape is skewed, then the signal from one of the extreme tracks will show a phase displacement with respect to the signal in the other track. The phase comparer 42 develops a signal which is proportional to the extent and direction of the phase displacement of these two signals. The output of the phase comparer is applied to an amplifier 44. The signals amplified by the amplifier 44 are fed, through leads 34, to the signal coil of the solenoid 26.

Thus, the solenoid is energized with a signal which is proportional to the phase displacement of the signal appearing in the two remote or extreme tracks. Since the phase displacement of the signal appearing in the two extreme tracks is a function of the amount of skew in the tape, then the signals applied to the solenoid are proportional to the amount of skew in the tape. It is appreciated that the energizing current applied to the coils of the solenoid may include a direct current bias which may be varied in either direction, depending upon the direction of the phase displacement or skew indicated by the phase comparer. The amplitude of this direct current bias may be controlled to give an initial azimuth adjustment to the transducer carried in the yoke of the arm.

While the signal responsive motive member has been described as being a solenoid, it is appreciated that the motive member may well be other types of motive members such, for example, as a magnetostrictive device or a piezoelectric device.

Thus there has been provided means for mounting a magnetic record transducer which provides a compensation for a skewing of the tape. The compensation being controlled by signals derived directly from the record on the tape and applied to the mounting means in such a manner as to effect the required correction.

What is claimed is:

1. In a magnetic recording-reproducing system, a magnetic record transducer, a mounting arm for said transducer, said arm including a transducer holding yoke, a rigid support portion, a first and a second leg member extending from said rigid support portion toward said yoke, said first one of said legs being substantially rigid with respect to said support portion, said second leg being deformable with respect to said first leg, a deformable link, said yoke being secured to said first leg by said deformable link, said second leg being directly secured to said yoke, and signal responsive motive means coupled to said second leg to effect deformation thereof in response to applied signals.

2. In a magnetic recording-reproducing system, a magnetic record transducer, a mounting arm including a transducer holding yoke, a rigid support portion, a first and a second leg member extending from said rigid support portion toward said yoke, said first leg member being substantially rigid with respect to said support portion, said second leg being deformable with respect to said first leg, a deformable link, said yoke being secured to said rigid leg by said deformable link, said yoke being secured directly to said second leg, signal responsive motive means operatively coupled to said second leg, means including said transducer for developing a control signal, and means for applying said control signal to said motive means whereby to deform said second leg in accordance with said control signal.

3. A mounting member for a magnetic recording-reproducing transducer, said mounting member comprising a transducer holding yoke, a rigid support portion, a first and a second leg member extending from said rigid support portion toward said yoke, said first leg being substantially rigid with respect to said support portion, said second leg being deformable with respect to said first leg, a deformable link, said yoke being secured to said rigid leg by said deformable link, said second leg being directly secured to said yoke, and signal responsive motive means coupled to said second leg to effect deformation thereof in response to applied control signals.

4. In a magnetic recording-reproducing system using a magnetic tape record member which is subject to skewing, means for compensating for said skewing comprising a magnetic record transducer, a mounting arm for said transducer, said arm including a transducer holding yoke, a rigid support portion, a first and a second leg member, said first leg being relatively rigid with respect to said support portion, said second leg being deformable with respect to said first leg, a deformable link coupling said yoke to said first leg, said second leg being directly connected to said yoke, a signal responsive motive means operatively coupled between said first and second leg for causing relative deformations of said second leg with respect to said first leg, means including said transducer for deriving a control signal indicative of the amount of skew in said tape record member, and means for applying said signal to said signal responsive motive means to effect deformation of said second leg in accordance with said control signals whereby to cause a corresponding rotation of said yoke about said deformable link.

5. In a magnetic recording-reproducing system using a magnetic record member which is subject to skewing, means for compensating for said skewing comprising a magnetic record transducer, a mounting arm for said transducer, said mounting arm including a transducer holding yoke, a rigid support portion, a first and a second leg extending from said support portion toward said yoke, said first leg being relatively rigid with respect to said support portion, said second leg being relatively deformable with respect to said first leg, a deformable link coupling said yoke to said first leg, said yoke being directly coupled to said second leg, a signal responsive, solenoid operated, motive member operatively coupled between said first and second legs for causing relative deformations of said second leg with respect to said first leg, means including said transducer for deriving a control signal indicative of the amount of skew in said tape record member, and means for applying said control signal to said solenoid to effect deformation of said second leg in accordance with said control signal whereby to cause a corresponding rotation of said yoke about said deformable link.

No references cited.